United States Patent
Kim

(10) Patent No.: US 7,204,531 B2
(45) Date of Patent: Apr. 17, 2007

(54) BUMPER BEAM STRUCTURE FOR VEHICLES

(75) Inventor: Ki-Chang Kim, Suwon-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 0 days.

(21) Appl. No.: 11/028,287

(22) Filed: Jan. 3, 2005

(65) Prior Publication Data
US 2006/0028033 A1   Feb. 9, 2006

(30) Foreign Application Priority Data
Aug. 4, 2004   (KR)   ........................ 10-2004-0061431

(51) Int. Cl.
B60R 19/18   (2006.01)
B60R 19/03   (2006.01)
B60R 19/04   (2006.01)

(52) U.S. Cl. .................. 293/120; 293/121; 293/133; 296/187.03; 296/187.04

(58) Field of Classification Search ............... 293/120, 293/121, 133, 132, 155; 296/187.03, 187.04, 296/187.09, 187.11
See application file for complete search history.

(56) References Cited

U.S. PATENT DOCUMENTS

| | | | | |
|---|---|---|---|---|
| 3,809,420 A | * | 5/1974 | Weller ..................... 293/121 |
| 3,997,207 A | * | 12/1976 | Norlin ..................... 293/110 |
| 4,998,761 A | * | 3/1991 | Bayer et al. ................ 293/121 |
| 5,092,512 A | * | 3/1992 | Sturrus et al. .............. 228/146 |
| 5,219,197 A | * | 6/1993 | Rich et al. ................. 293/120 |
| 5,290,078 A | * | 3/1994 | Bayer et al. ................ 293/120 |
| 5,425,561 A | * | 6/1995 | Morgan .................... 293/120 |
| 6,290,272 B1 | * | 9/2001 | Braun ...................... 293/120 |
| 6,428,064 B1 | * | 8/2002 | Frederick .................. 293/120 |
| 6,540,275 B1 | * | 4/2003 | Iwamoto et al. ............. 293/24 |
| 6,575,510 B2 | * | 6/2003 | Weissenborn ............... 293/121 |
| 6,622,450 B2 | * | 9/2003 | Nees et al. ................ 52/735.1 |
| 6,643,931 B2 | * | 11/2003 | Nees ...................... 29/897.312 |
| 6,663,150 B1 | * | 12/2003 | Evans ..................... 293/120 |
| 6,669,252 B2 | * | 12/2003 | Roussel et al. ............. 293/120 |
| 6,705,653 B2 | * | 3/2004 | Gotanda et al. ............. 293/132 |
| 6,755,461 B2 | * | 6/2004 | Seksaria et al. ........... 296/193.04 |

* cited by examiner

Primary Examiner—D. Glenn Dayoan
Assistant Examiner—Greg Blankenship
(74) Attorney, Agent, or Firm—Morgan Lewis & Bockius LLP

(57) ABSTRACT

A bumper beam includes a metallic center beam mounted with a plurality of vertical members each integrally crossed by a horizontal member. A plastic outer beam encompasses an external side of the center beam and a plurality of ribs are mounted at the outside of the plastic outer beam. The bumper beam features of a bumper beam needed in times of a low speed collision and a high speed collision between the vehicle and a pedestrian. As a result, injuries to the pedestrian can be reduced during the low speed collision and an impact absorption performance of the vehicle can be maximized during the high speed collision. Thereby, safety of the pedestrian and occupants inside the vehicle are increased.

8 Claims, 2 Drawing Sheets

BUMPER BEAM STRUCTURE FOR VEHICLES

CROSS-REFERENCE TO RELATED APPLICATIONS

The present application is based on, and claims priority from, Korean Application Serial Number 10-2004-0061431, filed on Aug. 4, 2004, the disclosure of which is hereby incorporated by reference herein in its entirety.

FIELD OF THE INVENTION

The present invention relates to bumper beam structure for vehicles. More particularly, the bumper beam structure is adapted to simultaneously satisfy attributes necessary for a collision at a high speed and a collision at a low speed.

BACKGROUND OF THE INVENTION

Typically, a bumper beam is mounted between a vehicle body and a bumper of the vehicle. The bumper beam allows the bumper to be supported to the vehicle body. The bumper beam is also designed to absorb and cushion impacts applied to the bumper.

One of the attributes provided by the bumper beam is, during a low speed vehicle collision, the bumper beam reduces injuries to a pedestrian hit by the vehicle by absorption of an appropriate impact energy. Another attribute the bumper beam solves is, during a high speed collision, the bumper beam provides adequate rigidity and strength to obtain a longer deformation time. Thereby, the bumper beam provides a maximum impact absorption performance capability of the vehicle.

SUMMARY OF THE INVENTION

An embodiment of the present invention provides a bumper beam structure for vehicles that is configured to have overall features of a bumper beam needed during a low speed collision and a high speed collision. Therefore, injuries inflicted on a pedestrian during a low speed collision can be reduced. Moreover, a high speed impact absorption performance of the vehicle can be maximized. Thereby, the safety of pedestrians and occupants inside the vehicle can be maximized.

In accordance with a preferred embodiment of the present invention, the bumper beam structure has a metallic center beam mounted with a plurality of vertical members. Each vertical member is integrally connected and crossed by a horizontal member. A plastic outer beam encompasses an external side of the center beam. A plurality of ribs are mounted at the outside of the plastic outer beam.

BRIEF DESCRIPTION OF THE DRAWINGS

For a better understanding of the nature and objects of the present invention, reference should be made to the following detailed description with the accompanying drawings, in which.

DETAILED DESCRIPTION OF PREFERRED EMBODIMENTS

Figure 1:
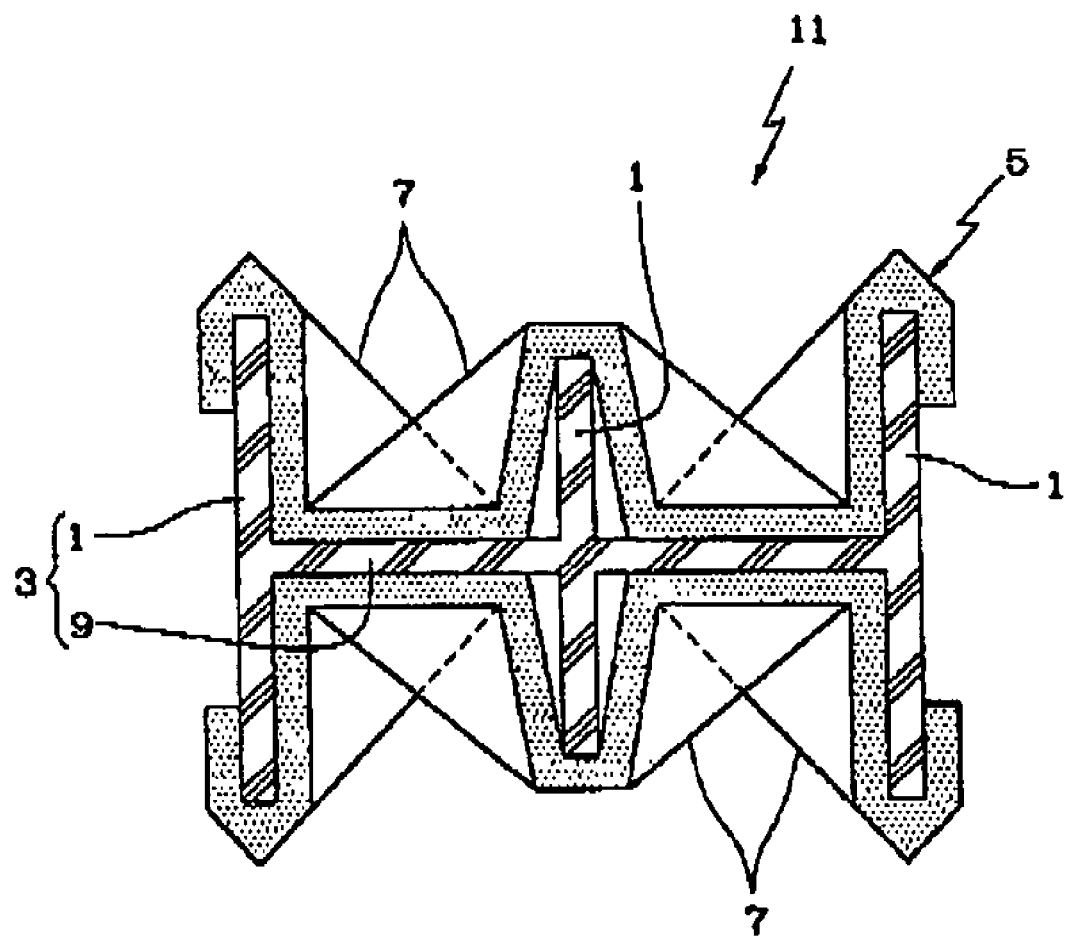
FIG. 1 illustrates a cross-sectional structure of a bumper beam for vehicles according to an embodiment of the present invention.

Referring to FIG. 1, the bumper beam structure (11) has a metallic center beam (3) mounted with a plurality of vertical members (1) each crossed by a horizontal member (9). A plastic outer beam (5) encompasses an external side of the center beam (3). A plurality of ribs (7) are formed at the outside of the outer beam (5). The center beam (3) preferably includes three vertical members (1) each crossed by a horizontal member (9). The outer beam (5) includes two members encompassing an upper side and a lower side of the center beam (3). The ribs (7) are disposed in spaces formed by the vertical members (1) of the center beam (3).

Preferably, two sides of each rib (7) abut on two surfaces of the outer beam (5) to form a triangular shape, and oblique sides of the ribs (7) cross each other along a longitudinal direction of the outer beam (5). The center beam (3) of the preferred embodiment is made of aluminum, but other metallic materials such as steel and the like, having a longer deforming time and a higher strength and rigidity, may be used for the center beam.

Figure 2:
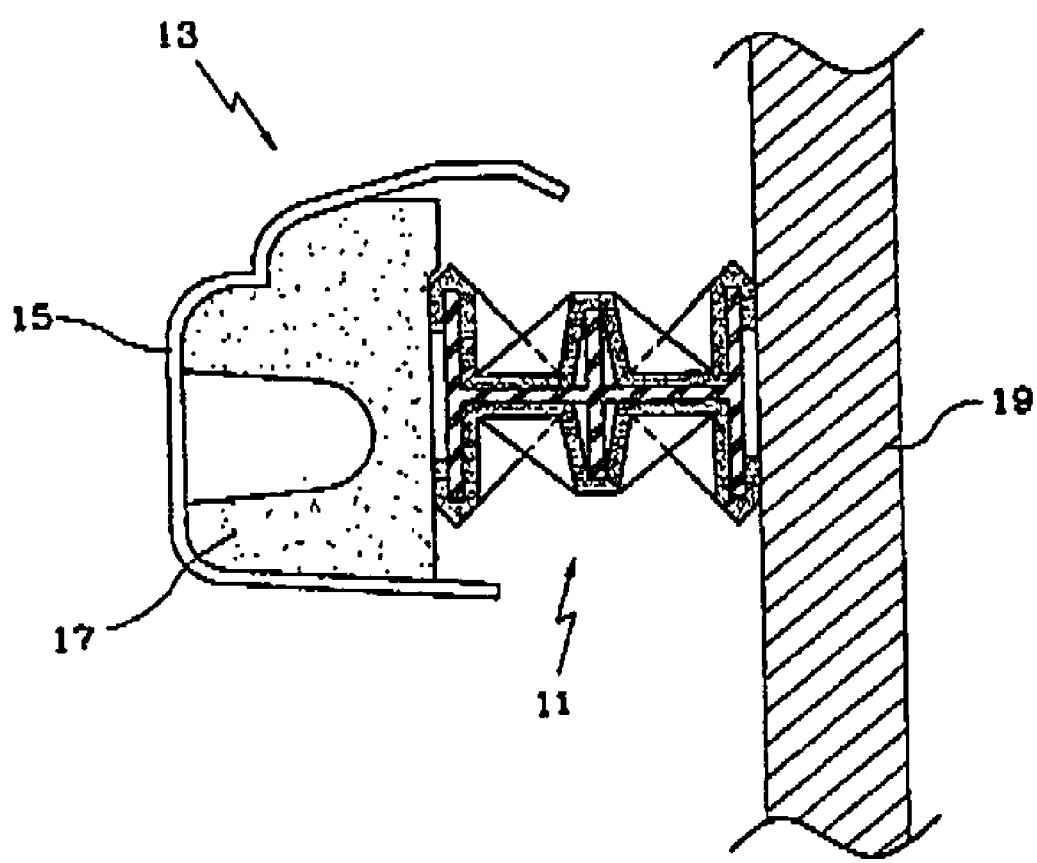
FIG. 2 illustrates a state of how the bumper beam of FIG. 1 is mounted at a vehicle.

Referring now to FIG. 2, the bumper beam (11) is illustrated how it connects to the vehicle. A bumper (13) includes a bumper cover (15) forming an exterior thereof, and an impact absorption material (17) for absorbing impact within the bumper cover (15). The overall strength and rigidity of the bumper beam (11) is provided by the center beam (3), the outer beam (5), and the ribs (7). As a result, intrinsic strength and rigidity of the center beam (3) may be reduced slightly from a conventional bumper beam, but the weakened strength and rigidity of the center beam (3) are complemented by the outer beam (5). Of course, the strength and rigidity of the bumper beam (11) are formed as to be weaker than those of a front part of a vehicle body (19) where the bumper beam (11) is mounted.

The bumper beam (11), thus constructed, is deformed prior to the vehicle body (19) deforming relative to an impact applied to the bumper (13) and absorbs impact energy along with the bumper (13). Particularly, the deformation of the bumper beam (11) acts to quickly absorb an impact energy at an initial stage of deformation when the impact is applied while the plastic outer beam (5) is broken. Henceforth, the center beam (3) functions to lengthen the deforming time of the bumper beam (11) as long as possible.

In use, when a pedestrian is hit by the vehicle at a low speed, injuries of the pedestrian are minimized by quick impact energy absorption performance of the outer beam (5). Moreover, when a pedestrian is hit by the vehicle at a high speed, a deforming time of the bumper beam (11) is lengthened by the center beam (3) to maximize the impact energy absorption performance of the vehicle. Thereby safety of the occupants of the vehicle is promoted. Under the high speed impact circumstance, the ribs (7) formed at the outer beam (5) helps the center beam (3) to contribute to the lengthening of the deforming time of the bumper beam (11).

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

As apparent from the foregoing, there is an advantage in the bumper beam structure for vehicles thus described according to the embodiment of the present invention in that overall features of a bumper beam needed in times of a collision at a low speed and for a collision at a high speed are provided. Thus, injuries to a pedestrian can be reduced during a low speed collision and an impact absorption performance of the vehicle can be maximized during a high speed collision, contributing to the safety of the pedestrian and occupants inside the vehicle.

What is claimed is:

1. A bumper beam structure for vehicles comprising:
    a metallic center beam mounted with a plurality of vertical members;
    a plastic outer beam comprising two members encompassing an upper side and a lower side of the center beam;
    a plurality of ribs mounted at the outside of the plastic outer beam and disposed in spaces formed by the vertical members of the center beam; and
    a horizontal member that integrally connects and crosses the plurality of vertical members.

2. The structure as defined in claim 1, wherein two sides of each rib abut on two surfaces of the outer beam to form a triangular shape, and oblique sides of the ribs cross each other along a longitudinal direction of the outer beam.

3. The structure as defined in claim 1, wherein the center beam is made of aluminum.

4. A vehicle bumper beam structure, comprising:
    a center beam coupled with at least two vertical members, the vertical members being coupled with a horizontal member;
    a first outer beam coupled with a first external surface of the center beam;
    a second outer beam coupled with a second external surface of the center beam; and
    a rib coupled with the outside of the first outer beam.

5. The bumper beam of claim 4, wherein the rib is a plurality of ribs.

6. The bumper beam of claim 5, wherein the ribs are disposed in spaces formed between the vertical members of the horizontal member.

7. The bumper beam of claim 5, wherein two sides of each rib abut two surfaces of the first outer beam to form a triangular shape.

8. The bumper beam of claim 5, wherein oblique sides of the ribs cross each other along a longitudinal direction of the outer beam.

* * * * *